Aug. 14, 1956  J. ADAMS, JR., ET AL  2,758,334

HOG SCRAPER PADDLE

Filed Jan. 11, 1954

INVENTORS
JAMES ADAMS JR.
GEORGE MARTON JR.
BY
James & Franklin
ATTORNEYS

United States Patent Office 2,758,334
Patented Aug. 14, 1956

2,758,334

HOG SCRAPER PADDLE

James Adams, Jr., Packanack Lake, and George Marton, Jr., Garfield, N. J., assignors to Raybestos-Manhattan, Inc, Passaic, N. J., a corporation of New Jersey Application January 11, 1954, Serial No. 403,205

2 Claims. (Cl. 17—18)

The present invention relates to an improved hog scraper paddle.

The conventional hog scraper paddle is composed of a laminated series of plies of heavy fabric such as duck, which is rubberized and vulcanized into a solid block, and is generally provided with a rubber cover. The paddle must be quite rigid and firm to properly perform its operation, but it must be flexible enough to yield under impact and not damage the skin of the hog during the de-hairing process.

The operation of such paddles is attended with frequent breakdowns due to at least three sources of structural weakness. (1) The paddle in operation is bent to a rather small diameter, thus tending to extend the outside ply or plies beyond its or their elastic limit; and failure results from the outside ply or plies breaking horizontally across the back. (2) The outside ply or plies taking the greatest part of the tension during flexure, each successive ply (from top to bottom) bears less of the load or tension, with the result that the inside ply or plies is then usually actually under compression. Frequently the inside ply or plies fail just above the clamped part of the paddle due to this flexure-compression. (3) The paddles operate in a steam chamber, and moisture finding its way into the body of the paddle causes swelling of the fabric plies of the body. The resulting sponginess of the fabric layers causes the paddle to lose its resilience or "bounce" and quickly results in the deterioration of the fabric and the paddle as a whole.

The prime object of the present invention centers about the provision of a hog scraper paddle designed and constructed to effectively overcome these three sources of structural weakness with resultant frequent paddle breakdown.

To the accomplishment of this prime object and such other objects as may hereinafter appear the present invention is directed to the hog scraper paddle structure as sought to be defined in the appended claims, and as described in the following specification and shown in the accompanying drawings, in which:

Figure 1:
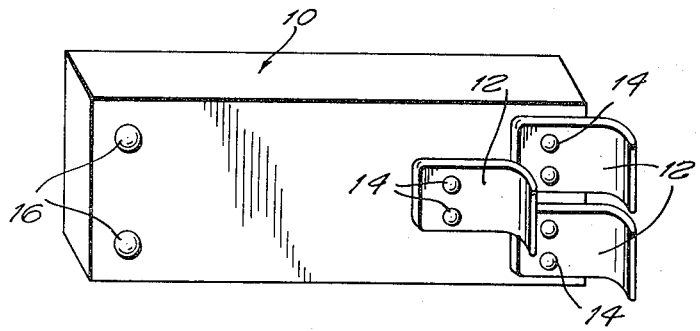
Fig. 1 is a perspective view of a hog scraper paddle.

Referring now more in detail to the drawings, and having reference first to Fig. 1 thereof, the hog scraper paddle of the present invention embodies the same structural form and configuration of the conventional hog scraper paddles, and comprises an elongated paddle structure 10 of generally rectangular cross-section having mounted on the outside face thereof scraper blades 12, the latter being secured to the paddle by means of rivets 14 extending through the paddle body, said paddle being provided at its other end with the through apertures 16 for receiving securing elements such as bolts for attaching the paddle to the spoke or arm of a rotor forming part of the hog de-hairing machine. A plurality of such paddles are mounted on the spokes or arms of the rotor. In the operation of the de-hairing machine the hogs are fed through a steam chamber and are operated upon as they travel through the chamber by a number of these rotors, each of the paddles being bent or flexed to a relatively small diameter under the impact of its operation against the hair and body of the hog.

Figure 2:
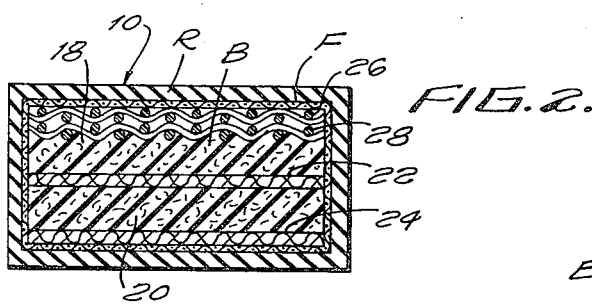
Fig. 2 is a cross-sectional view of a hog scraper paddle built according to the principles of the present invention.

Referring now to Fig. 2 of the drawings the paddle 10 of the present invention comprises a body section B, a fabric section F enveloping the body section, and an outer rubber cover R encasing the same, said sections being vulcanized into a solid paddle block of the configuration shown in Fig. 1.

To meet and solve the problems hereinabove described these referred to elements of the paddle are selected in material and organized in arrangement so as to accomplish the following characteristics and functional behavior of the paddle:

1. The outside ply (or plies) of the fabric section F is made of a member which is capable of taking up and withstanding the maximum tension to which this ply is subjected in flexure and which is possessed of a relatively high stretch property to permit the same to yield to the degree of extension which this ply undergoes in flexure;

2. The inside ply (or plies) of the fabric section F is made of a member which is capable of yielding to the compression stress to which it is normally subjected in flexing and which is strong enough to take up or withstand such compression forces.

Both the outside and inside plies also have the property of providing in the main for the strength of the paddle to give it the rigidity and firmness required; and 3. The body B is composed of a material which will, in the main, provide, for the resilience or "bounce" of the paddle structure, permitting not only the desired paddle flexibility under impact, but also the snap-back action to the straight and rigid state of the paddle and which will also withstand or resist the blooming or swelling and resulting deterioration action of the steam.

To accomplish this the body section B is composed mainly of rubber reinforced with textile fibers; and the fabric section F enveloping the body section B is composed of a nylon fabric. In the form of the invention shown in Fig. 2 the body B is also provided with a median transverse ply of a heavy fabric (a similar ply of which may be incorporated in the bottom of the body), for the purpose of rigidifying the body transversely and to minimize lateral flow incident to the action of the securing rivets 14 and the securing mounting bolts at 16. In Fig. 2, therefore, the body is made to comprise mainly a textile fiber reinforced rubber, here divided into two sections 18 and 20 arranged on the opposite sides of the medially located heavy fabric (such as made of duck) layer 22, a similar fabric layer 24 being incorporated in the bottom of the body.

The enveloping fabric section F is preferably composed of an open weave nylon fabric surrounding or enveloping the body B. In the top or outside of the paddle (adjacent the side or face of the paddle which mounts the paddle blades 12) the fabric section is made to include at least an added layer of nylon fabric; and in the invention form shown in Fig. 2 two added layers of nylon fabric of a heavy texture 26 and 28 are added to form part of the fabric section.

This body section B and the rubber fabric section F with the preferred additive elements are encased in the rubber cover R, such sections being vulcanized as aforesaid into a solid block. In this construction the outside ply of the nylon fabric envelope F with the added nylon ply or plies 26, 28 constitute the member, which is capable of taking up the maximum tension under flexure and which is possessed of the desired high stretch characteristic permitting the outside of the paddle to yield to the required extension under flexure. The nylon bottom of this envelope comprises the member which is capable of yielding to compression strains to which the bottom or inside of the paddle is normally subjected, this member being strong enough to take up the compressive forces involved. The outside and inside nylon layers or plies impart both the strength and rigidity property to the paddle structure. The reinforced rubber body imparts the resilience and springiness to the paddle unit enabling the desired flexure to take place and providing in turn the snap-back action which is important to effect the return of the paddle to its normally straight and rigid state after the de-hairing operation. It is further found, as aforesaid, that the reinforced rubber body resists the action of the steam and obviates swelling or sponginess of the body, thus minimizing this source of deterioration of paddles now in use. The result is an improved paddle structure which has considerably longer life and the use of which results in less replacement and machine stoppages.

Figure 3:
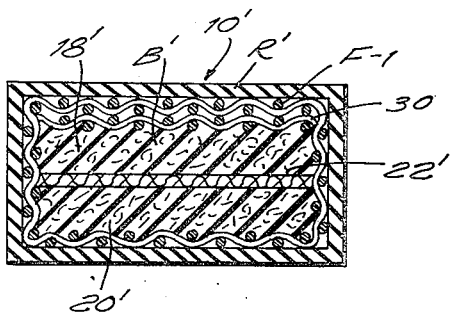
Fig. 3 is a view similar to Fig. 2 showing a modification thereof.

In Fig. 3 of the drawings I show a modified form of the paddle structure in which those parts which are similar to the parts of the structure shown in Fig. 2 are indicated by the same, but primed, reference characters. In this modification the fabric envelope F-1 is made to comprise a nylon fabric of relatively heavy texture and comprising a single ply surrounding the body $B^1$, supplemented by an additional ply of nylon fabric 30 at the top or outside section of the paddle. In this structural form the body $B^1$ comprises a median layer of heavy fabric $22^1$ such as duck, and the fiber reinforced rubber bodies $18^1$ and $20^1$ on opposite sides thereof (the additional bottom ply of fabric 24 shown in Fig. 2 being, however, omitted).

Figure 4:
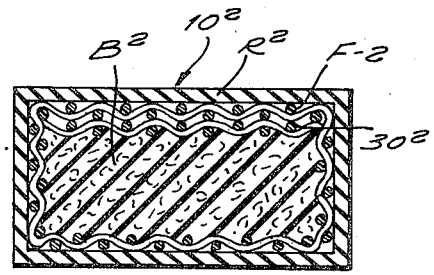
Fig. 4 is a view similar to Fig. 2 showing a further modification thereof.

In the modification of Fig. 4 of the drawings, parts similar to the parts shown in Fig. 2 are indicated by the same characters modified by the exponent 2. The nylon fabric envelope F-2 supplemented by an additional ply of nylon $30^2$ at the top or outside of the paddle is the same as that shown for the invention form of Fig. 3. In this modification the body $B^2$ is composed entirely of rubber reinforced with textile fibers, fabric plies being entirely eliminated or omitted from the body.

The improved paddle of the present invention, the principles of constructing the same, the manner of employing the paddle, the functional behavior and advantages thereof will, in the main, be fully apparent from the detailed description thereof. It will be further apparent that changes may be made in the construction of the paddle without departing from the spirit of the invention defined in the following claims.

We claim:

1. A hog scraper paddle comprising a body section, a fabric section enveloping the body section and an outer rubber section encasing the same, the body section being composed of a median transverse ply of a fabric and rubber reinforced with textile fibers on opposite sides of said median ply, and the enveloping fabric section being composed of nylon, said sections being vulcanized into a solid block.

2. A hog scraper paddle comprising a body section, a fabric section enveloping the body section and an outer rubber section encasing the same, scraper blades mounted on a face of said paddle, the body section being composed of a median transverse ply of a fabric and rubber reinforced with textile fibers on opposite sides of said median ply, the enveloping fabric section being composed of nylon, the said fabric section including at least an added layer of nylon fabric at the scraper blade face of the paddle, said sections being vulcanized into a solid block.

References Cited in the file of this patent

UNITED STATES PATENTS

| | | |
|---|---|---|
| 1,998,816 | Meyer | Apr. 23, 1935 |
| 2,107,013 | Morgan | Feb. 1, 1938 |
| 2,336,149 | Freedlander | Dec. 7, 1943 |
| 2,337,985 | Freedlander | Dec. 28, 1943 |
| 2,604,656 | Anderson et al. | July 29, 1952 |
| 2,633,227 | Hutchins | Mar. 31, 1953 |
| 2,669,280 | Augustin | Feb. 16, 1954 |